United States Patent
Kosiorek

(10) Patent No.: US 9,228,553 B2
(45) Date of Patent: Jan. 5, 2016

(54) METHOD OF REFURBISHING A FUEL INJECTOR

(71) Applicant: North America Fuel Systems Remanufacturing, LLC, Kentwood, MI (US)

(72) Inventor: Roman Francis Kosiorek, Kentwood, MI (US)

(73) Assignee: NORTH AMERICA FUEL SYSTEMS REMANUFACTURING, LLC, Kentwood, MI (US)

( * ) Notice: Subject to any disclaimer, the term of this patent is extended or adjusted under 35 U.S.C. 154(b) by 247 days.

(21) Appl. No.: 14/041,521

(22) Filed: Sep. 30, 2013

(65) Prior Publication Data
US 2014/0090247 A1    Apr. 3, 2014

Related U.S. Application Data

(60) Provisional application No. 61/708,350, filed on Oct. 1, 2012.

(51) Int. Cl.
*F02M 61/16* (2006.01)
*B23P 6/00* (2006.01)
*F02M 57/02* (2006.01)
*B24B 1/00* (2006.01)

(52) U.S. Cl.
CPC ............... *F02M 61/168* (2013.01); *B23P 6/00* (2013.01); *F02M 57/025* (2013.01); *B24B 1/00* (2013.01); *F02M 2200/8069* (2013.01); *Y10T 29/49233* (2015.01); *Y10T 29/49302* (2015.01)

(58) Field of Classification Search
CPC .......... B23P 6/00; B24B 1/00; F02M 51/061; F02M 51/0653; F02M 61/168; F02M 2200/80; F02M 2200/8069; Y10T 29/49302; Y10T 29/40407
See application file for complete search history.

(56) References Cited

U.S. PATENT DOCUMENTS

| | | | | | |
|---|---|---|---|---|---|
| 5,139,042 | A | * | 8/1992 | Calhoun | F16K 21/18 137/15.17 |
| 5,428,883 | A | * | 7/1995 | Stieglitz | F02M 51/0614 239/585.1 |
| 6,339,877 | B1 | * | 1/2002 | Straub | B23P 6/00 29/557 |
| 7,861,738 | B2 | * | 1/2011 | Erbes | B23P 6/00 137/15.08 |
| 2008/0217421 | A1 | * | 9/2008 | Lewis | F02M 57/023 239/5 |
| 2009/0113707 | A1 | * | 5/2009 | Kosiorek | B23P 6/00 29/888.42 |
| 2009/0126193 | A1 | * | 5/2009 | Kosiorek | F02M 63/007 29/890.121 |
| 2009/0217523 | A1 | * | 9/2009 | Johnson | B23P 6/00 29/888.011 |
| 2012/0234296 | A1 | * | 9/2012 | Graspeuntner | F02M 55/002 123/469 |
| 2013/0260647 | A1 | * | 10/2013 | Kosiorek | B24B 1/00 451/28 |

* cited by examiner

*Primary Examiner* — Alexander P Taousakis
(74) *Attorney, Agent, or Firm* — Bill C. Panagos; J. Scott Martin; Butzel Long, P.C.

(57) ABSTRACT

Methods are disclosed to refurbish a fuel injector to original manufacturing operational tolerances.

6 Claims, 5 Drawing Sheets

METHOD OF REFURBISHING A FUEL INJECTOR

FIELD OF DISCLOSURE

In one aspect, the present disclosure relates generally to a method to refurbish a three way, two position magnetic valve module (MVM) in a fuel injector, including a common rail injector.

In another aspect, the present disclosure relates generally to a refurbished common rail fuel injector with a refurbished three way, two position magnetic valve.

In another aspect, the present disclosure relates generally to a refurbished diesel fuel common rail fuel injector with at least one refurbished three way, two position (amplifier control) diesel magnetic valves and one 2 position, 2 way valve (nozzle needle control).

TECHNICAL FIELD

In one embodiment, the present disclosure relates to a method of refurbishing fuel systems having fuel injectors, including common rail fuel injectors, equipped with at least one magnetic valve module. The fuel system may be a common rail injector and system and be of any fuel type, including gasoline and diesel. Remanufacturing processes refurbish the valve seat(s) and the sealing surfaces to remove wear and cavitation to valve surfaces, which may be caused by fuel erosion. The process of removing wear and cavitation due to fuel erosion is complex. Removing wear (and cavitation) from one component requires removing material stock from the worn or cavitated part while at the same time, removing the same amount of stock from the other mating surfaces to ensure valve stroke and spool position in the fuel injector overlap are maintained. Thus a certain amount of stock must be machined from the sealing surfaces on both the valve needle and the housing seat. Modern fuel systems, and especially common rail fuel systems, operate under very high pressure pressures, and it is found that magnetic vales may be advantageously used to control operation of the injector nozzle needle and fueling quantity to each cylinder, and other magnetic valves may be used to control the activation of the fuel injector's internal pressure amplifier. Because of the pressure of the fuel, these valve areas are prone to wear, erosion and cavitation that may shorten the life of the injector. In addition, even if normal life expectancy for the injector is achieved, the injectors are expensive, and refurbishing the worn, eroded and/or cavitated surfaces on the injectors may be one way to reduce the need to buy new injectors when the valve seats are no longer optimal due to wear, erosion and/or cavitation.

Accordingly, there is a need for various methods of refurbishing a fuel injector, including a common rail fuel injector, having a magnetic valve module to maintain sealing tolerances and extend the life of the fuel system.

SUMMARY

In one embodiment, there is disclosed a method for re-furbishing a fuel system having a fuel injector with a magnetic valve surface. In another embodiment, there is disclosed a method to refurbish a common rail fuel system having a common rail injector with a magnetic valve surface. In one aspect, the magnetic valve may control the nozzle needle and the fueling quantity to each cylinder. In another aspect, the magnetic valve may control the activation of the fuel injector's internal pressure amplifier. In another aspect, injector is equipped with one or more three way, two position magnetic valves, wherein one controls the activation of the fuel injector's internal pressure amplifier nozzle needle and fueling quantity to each cylinder of an engine, and another controls the activation of the nozzle needle to inject fuel into the combustion chamber. In any case, the method may include removing an established amount of material or stock from the valve needle conical seat to remove wear and fuel erosion wherein the amount of stock removed may vary based on wear depth, removing a corresponding amount of material or stock from the face of the housing, and removing a corresponding amount of material or stock from the sealing disc face. In some instances, that valve needle guidance bore and the valve seat are two separate components, Depending upon the valve and its construction, it may be that a spool edge that require a certain amount of overlap with the bore be made to ensure high pressure sealing after refurbishing.

DETAILED DESCRIPTION

Figure 1:
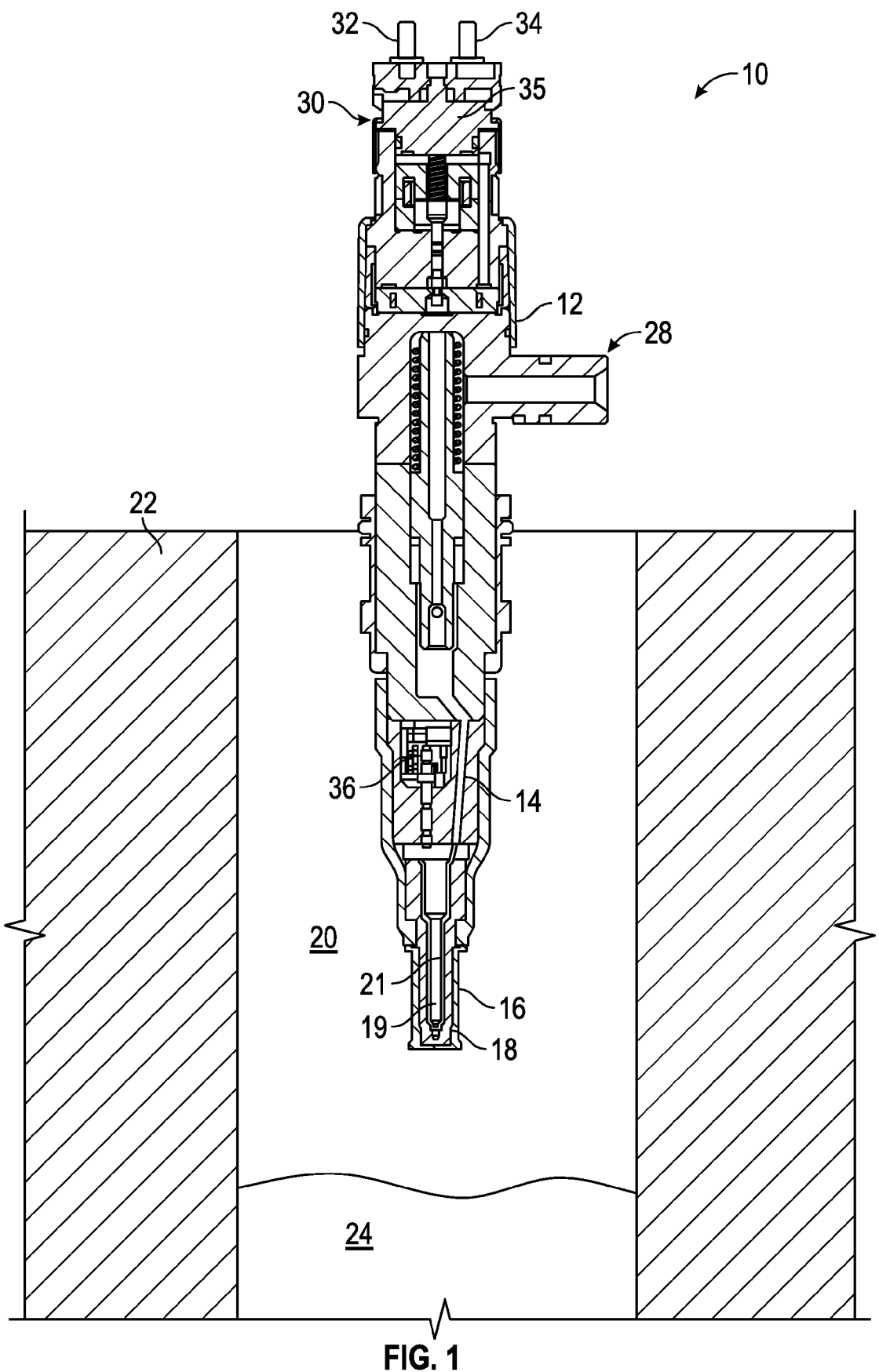
FIG. 1 is an exemplary cross-sectional view showing the overall assembly of a common rail fuel injector.

Turning now to the drawings, wherein like numbers refer to like structures, and particularly to FIG. 1, there is shown therein a common rail fuel injector 10 equipped with at least one, and in this embodiment, one, three way magnetic valve seat and one 2 way, position valve. The present disclosure describes a method to re-furbish a valve seat in a fuel injector such that original manufacturing tolerances are maintained after refurbishing, and injector bodylife is extended.

While a common rail fuel injector is described, it is understood that any fuel injector may be refurbished according to the following description. The common rail injector 10 includes a body 12 having fuel passages 14, nozzle 16, with apertures 18 for injecting fuel into a cylinder 20, in an engine 22. The cylinder has a piston 24 disposed therein for reciprocal movement in the cylinder 22, as is well known in the art. The fuel injector is usually fastened at injector nut 26 into the engine block, to hold the injector in position in the cylinder as is known in the art. The injector has a common fuel port 28, which is connected with the fuel system (not shown) to admit fuel under pressure into the injector.

In general operation, the fuel is admitted into the injector under pressure. A valve controls the admission of fuel and metering the fuel into the body of the injector, where a needle 19, in a bore 21 controls the introduction of the fuel into the cylinder. There is further provided a valve system to control the pressure amplification of the fuel in the body to ensure precise fueling to the engine, all in a manner well known to those skilled in the art.

The injector as shown in FIG. 1 has one three way two position magnetic valve and one 2 way 2 position valve. In this embodiment, a Diesel Fuel system will be described, but it is understood that any fuel system could be used. Electromagnetic injector needle actuator module 30 is equipped with electrical connectors 32, 34, and electromagnetic stator 35. Signals from the controller, (not shown) energize the stator, to actuate the needle and admit fuel into the cylinder of an engine, and the nozzle portion at its opposite end. In this embodiment, the injector includes a control valve module 36 to control the activation of the fuel injector's internal pressure amplifier. These valves are, in this embodiment, diesel magnetic valves (DMV), and may be three way, two position valves. Common rail fuel injectors of this type are often called HDEP injectors, available from Robert Bosch GmbH.

Figure 2:
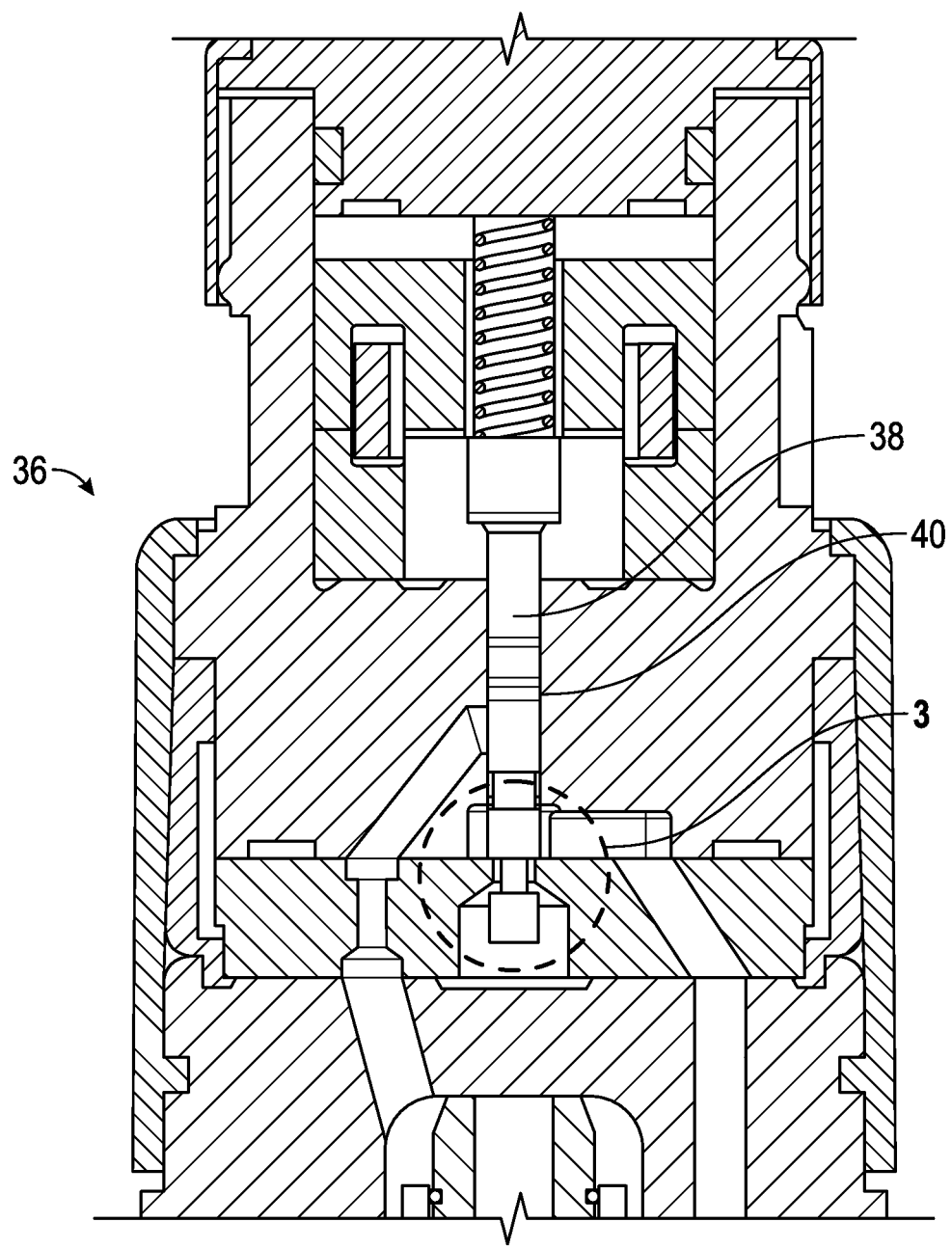
FIG. 2 is a cross-sectional detailed view of the module of the common rail fuel injector of FIG. 1 showing nozzle needle magnetic valve.

FIG. 2 is a cross-sectional detailed view of the module of the common rail fuel injector of FIG. 1 showing DMV 36, which controls the activation of the fuel injector's internal pressure amplifier. It can be seen that the valve stem 38 is configured such that as it moves through a bore 40 in response to signals from the controller, it permits fuel to pass through the passages 42 and 44 to regulate fuel pressure within the injector pressure and permit fuel to pass through the nozzle in the desired pressure and quantity in a manner well known to those in the art.

Figure 3:
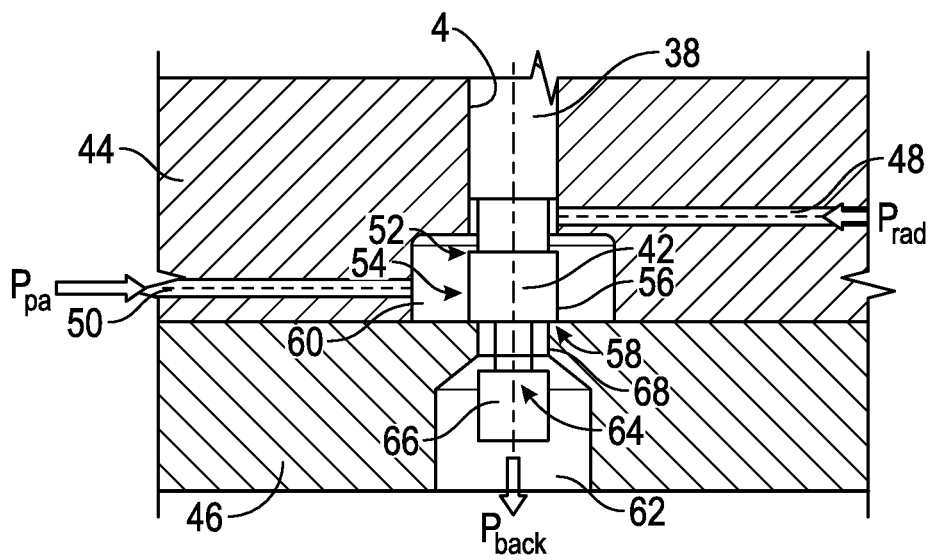
FIG. 3 is a detailed view of detailed view of a magnetic valve of the common rail injector for FIG. 1 showing a three way two position magnetic valve having a spool valve edge.
Figure 4A:
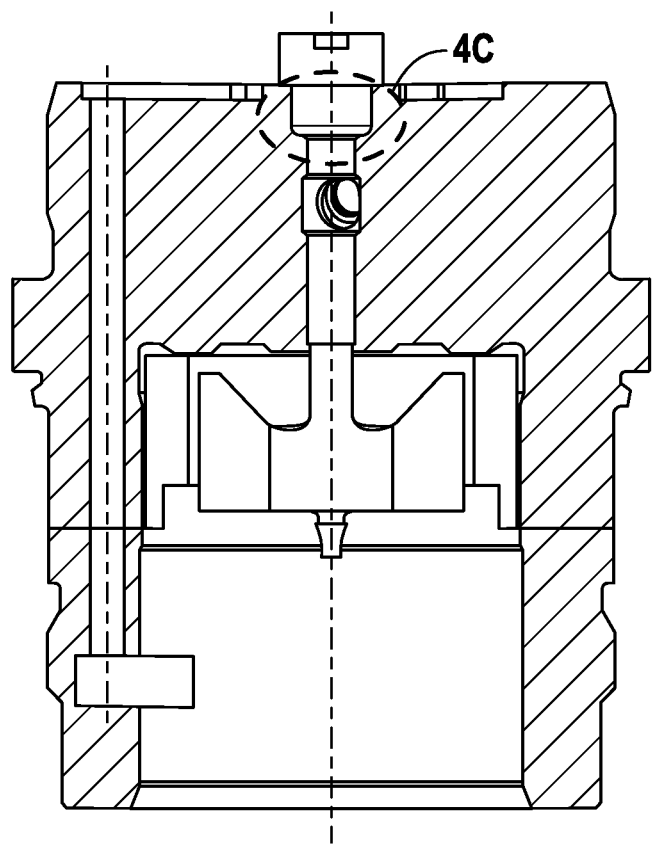
FIG. 4A is another detailed view of a magnetic valve of a common rail fuel injector three way two position magnetic valve having a spool edge.
Figure 4B:
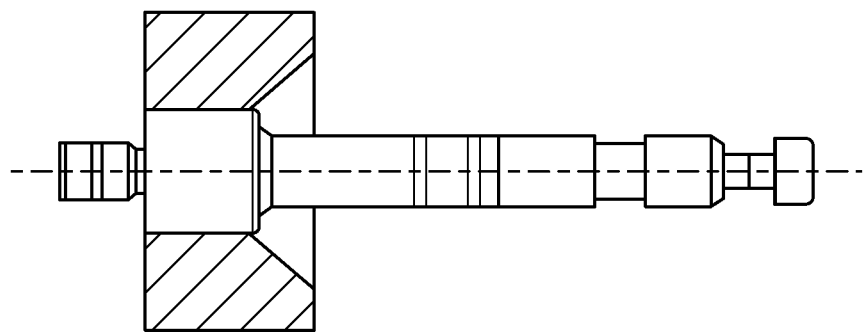
FIG. 4B is a detailed view of the valve body.
Figure 4C:
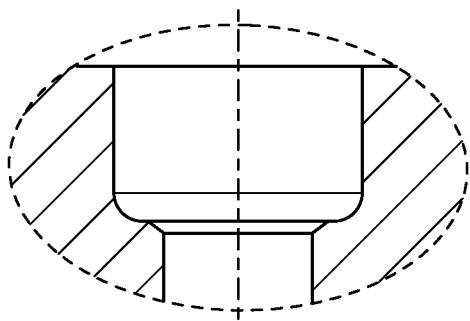
FIG. 4C is a detailed view of the spool edge of FIG. 4A, showing the effect of machining on the spool edge.
Figure 5A:
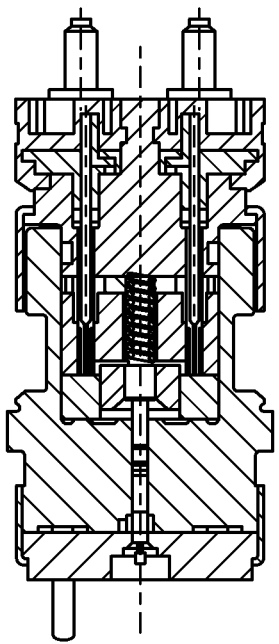
FIG. 5A is a cross sectional view of another embodiment of a common rail injector three way two position magnetic valve having a sealing disc.
Figure 5B:
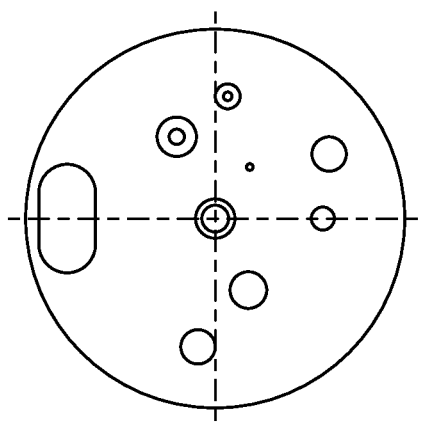
FIG. 5B is a top view of the sealing disc of FIG. 5A showing the fuel passage and valve seat.
Figure 5C:
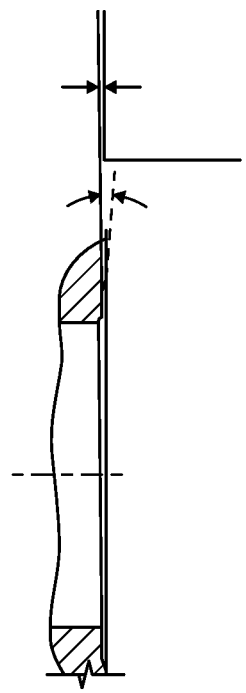
FIG. 5C is a detailed view of the interaction between the sealing disc and the spool edge of a valve stem.
Figure 5D:
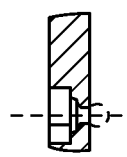
FIG. 5D is a detailed view of the sealing disc in place on a conical seat.

FIG. 3 is a detailed view of the 2 position, way DMV module of FIG. 2, showing the valve stem body with valve 43 in the bore as it permits pressurized fuel from passage 32. DMV 36 is complex as the valve needle guidance bore and the valve needle seat are two separate components, 45 and sealing disc 46 respectively. High pressure passage 48 communicates with the common rail fuel system, and passage 50 communicates with the fuel already in the injector. Fuel pressure from the fuel from the common rail system and the fuel injector are directed to chamber 60 to move the valve stem body within the bore to control pressure amplification of fuel to the needle through passage 62.

Valve 43 is equipped with a spool edge 52 at end 54, and a conical seat surface 56, which seats on conical seat 58. A pintle 64 is provided to permit fuel to pass around terminus 66 of the valve stem. The fact that the DMV 36 is made of two components adds challenges to the remanufacturing of this component as the guidance runout, and the axial tolerances may be measured as being in the range of about 1-3 microns.

Typical DMVs utilize a housing with the bore guidance and seat manufactured in one step and in the same components. Also of challenge when remanufacturing a fuel injector is the fact that one must typically machine a certain amount of material stock from the sealing surfaces on both the valve needle and housing seats, which requires one to machine other datum surfaces to ensure the valve stroke tolerances are ensured. In addition, a valve such as the one shown herein presents the additional challenge with not only a typical valve seat, but also a spool edge that requires a certain amount of overlap with the bore to ensure high pressure sealing of the valve.

In the remanufacture of a three way, two position DMV, the valve stem needle conical seat must be reground to remove wear and fuel erosion (cavitation). By way of example, 0.010 mm may be removed, but this amount may vary and is dependent on wear depth. As the stock is removed from the valve needle conical seat, the valve stroke is increased by a corresponding amount, which in this example would be 0.010 mm. This increase in valve stroke may lead to delayed response times and other performance concerns. The spool edge functionality is also affected as the spool does not enter the valve bore and effectively seal off hydraulic (fuel) pressure.

In order to address this, a corresponding amount of material from the face of the housing is removed. The second counteraction is to remove the corresponding amount of material from the sealing disc face. This may be accomplished by lapping or grinding methods or use of abrasive slurry or any other manner to remove material in a controllable manner.

In addition, the valve seat on the sealing disc would need to be reground or lapped or subjected to an abrasive slurry to remove wear and fuel erosion. This action also presents a challenge to the complex stack up of spool, valve and stroke. For example, if 0.003 mm is removed from the conical seat on the sealing washer, two counteractions are possible to address the issue. Either 0.007 mm must be removed from the face of the housing, or 0.007 mm must be removed from the sealing disc face. Any combination of stock removals on the surfaces can be achieved, but in each case actual stock removal must be known to ensure valve stroke and spool overlap are maintained.

By way of example, and as seen in FIGS. 4A through 5D, the DMV is disassembled and the valve conical edge is ground 0.010 mm to remove fuel erosion. If the control valve $CV_{oal}=x_1-.010$; $CV_{spool}=x_2-0.10$, and the Stroke of the valve=$x_3+0.10$, then the sealing face of the disc ($S_{face}$) must be ground to remove 0.010 mm, the $B_{face}$ is not ground, and the stroke and the stroke spacer are then correct for the remanufactured DMV.

The described process was validated using two remanufactured DMV's. The DMVs used were those that control the activation of the common rail diesel fuel injectors internal pressure amplifier. These parts had needle valve seats that were reground, and the sealing disc was machined accordingly to ensure stroke/spool edge tolerances were achieved. The key test parameter is seen in Rail Pressure Max_6, where the injector is pressurized to 1200 Bar without injection, and leakage is measured. Both samples measured zero leakage. In addition, all key injection quantities were near nominal tolerance. The performance data is shown in Table 1.

TABLE 1

| | DateTime | | |
| --- | --- | --- | --- |
| | Dec. 16, 2011 15:26 | Dec. 16, 2011 15:48 | |
| | SerialNo | | |
| | R1EP0C34 | R1EP0C35 | SPEC |
| VSEFlow_1 | 41.5 | 41.900002 | |
| VSEFlow_2 | 25.799999 | 26.1 | |
| VSEFlow_3 | 13.6 | 13.2 | |
| VSEFlow_4 | 12.8 | 12.6 | |
| VSEFlow_5 | 0 | 0 | |
| VSEFlow_6 | 0 | 0 | Less than 2.2 l/h |
| RailPressureMax_6 | 1199.693848 | 1199.717407 | 1200 BAR +/− 5 BAR |

As can be seen with resort to the data in Table 1, the DMVs subjected to the remanufacturing process of the instant disclosure performed well, with no leakage and being comparable to new parts.

Various combinations of material may be removed, but the amount of each combination must be known in order to ensure the proper valve stroke and spool overlap.

While the invention has been described, it is understood that the words used herein are words of description, not words of limitation. Many variations and modifications are possible without operating from the scope and spirit of the invention as set forth in the appended claims.

What is claimed as new and desired to be protected by Letters Patent of the United States is:

1. A method to refurbish a fuel injector having at least one three way, two position magnetic valve module (MVM), said MVM having a valve stem body moveable within a two component body having a first and second body component in sealing engagement with each other, said valve stem including a needle having an elongated body, with a spool having a spool edge, said needle body moveable within a needle guidance bore carried by one body component, said spool edge cooperatively engagable with a surface on said second body component; and needle valve seatable within a magnetic valve needle seat carried in said other body component; said method comprising;

determining from which part of the valve body to remove an amount of material sufficient to remove wear, cavitation and fuel erosion;

removing a sufficient amount of material from said worn MVM part to remove wear, cavitation and fuel erosion;

determining from which part of the MVM to remove an amount of material to ensure manufacturing tolerances of valve stroke and spool overlap are maintained and removing a sufficient amount of material from another part of the MVM assembly to ensure manufacturing tolerances of valve stroke and spool overlap are maintained for the MVM.

2. The method of claim 1, wherein determining from which part of the MVM to remove material to maintain manufacturing tolerances for valve stroke and spool overlap includes determining the amount of material removed from the valve body; determining the effect of the removal of said material on manufacturing tolerances; and removing an additional amount of material from another part of the MVM to compensate for the material removal from the valve body.

3. The method of claim 1, wherein material is removed from at least the valve body spool edge and the valve needle seat.

4. The method of claim 3, further including removing material from at least one of the first or second body components to ensure manufacturing tolerances are maintained for valve stroke and spool overlap.

5. The method of claim 1, wherein said material is removed by grinding, lapping or abrasive slurry.

6. The method of claim 1, wherein said fuel injector is a common rail fuel injector.

* * * * *